United States Patent
Iqbal et al.

(10) Patent No.: US 10,412,192 B2
(45) Date of Patent: Sep. 10, 2019

(54) JOINTLY MANAGING A CLOUD AND NON-CLOUD ENVIRONMENT

(71) Applicant: International Business Machines Corporation, Armonk, NY (US)

(72) Inventors: Mickey Iqbal, Plano, TX (US); Hans-Juergen Kunde, Obertshausen (DE); Birgit M. Pfitzmann, Wettswil (CH); Marcel Schlatter, Rheinfall (CH); Gerhard A. Widmayer, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 15/150,838

(22) Filed: May 10, 2016

(65) Prior Publication Data
US 2017/0331920 A1   Nov. 16, 2017

(51) Int. Cl.
G06F 15/173 (2006.01)
H04L 29/08 (2006.01)
H04L 12/24 (2006.01)

(52) U.S. Cl.
CPC ........ *H04L 67/327* (2013.01); *H04L 41/0686* (2013.01); *H04L 41/0873* (2013.01);
(Continued)

(58) Field of Classification Search
CPC ... H04L 67/327; H04L 41/0686; H04L 41/20; H04L 67/104
(Continued)

(56) References Cited

U.S. PATENT DOCUMENTS

| 2012/0011077 A1* | 1/2012 | Bhagat | G06F 21/554 |
| | | | 705/317 |
| 2012/0109703 A1* | 5/2012 | Agrawal | G06Q 10/063 |
| | | | 705/7.22 |

(Continued)

OTHER PUBLICATIONS

J. Hwang, K. Bai, M. Tacci, M. Vukovic and N. Anerousis, "Automation and orchestration framework for large-scale enterprise cloud migration," in IBM Journal of Research and Development, vol. 60, No. 2-3, pp. 1:1-1:12, Mar.-May 2016. (Year: 2016).*

(Continued)

*Primary Examiner* — Taylor A Elfervig
(74) *Attorney, Agent, or Firm* — Cantor Colburn LLP; Grant Johnson (57) ABSTRACT

Examples of techniques for jointly managing a cloud and non-cloud environment are disclosed. In one example implementation according to aspects of the present disclosure, a method includes: receiving a request to be executed on one of a cloud resource and a non-cloud resource using one of cloud orchestration and non-cloud orchestration, the request comprising a plurality of tasks; scheduling the first task for execution on the cloud resource by a cloud orchestration device using a joint cloud and non-cloud management device; scheduling the second task for execution on the non-cloud resource by a non-cloud orchestration device using a non-cloud management device; and scheduling the third task for execution on the non-cloud resource by the non-cloud orchestration device using the joint cloud and non-cloud management device.

20 Claims, 7 Drawing Sheets

(52) U.S. Cl.
    CPC .......... *H04L 41/20* (2013.01); *H04L 41/5096* (2013.01); *H04L 67/104* (2013.01)

(58) Field of Classification Search
    USPC .......................................................... 709/223
    See application file for complete search history.

(56) References Cited

U.S. PATENT DOCUMENTS

| | | | | |
|---|---|---|---|---|
| 2012/0159420 | A1* | 6/2012 | Yassin | G06F 11/3672 717/101 |
| 2012/0259909 | A1* | 10/2012 | Bachelor | G06N 3/02 709/201 |
| 2013/0067090 | A1* | 3/2013 | Batrouni | H04L 67/1097 709/226 |
| 2014/0047107 | A1* | 2/2014 | Maturana | H04L 43/04 709/224 |
| 2014/0089495 | A1* | 3/2014 | Akolkar | H04L 41/147 709/224 |
| 2014/0181277 | A1* | 6/2014 | Burns | G06F 9/541 709/221 |
| 2015/0058459 | A1* | 2/2015 | Amendjian | H04L 41/5058 709/223 |
| 2015/0163285 | A1 | 6/2015 | Chakra et al. | |
| 2016/0048408 | A1* | 2/2016 | Madhu | G06F 11/1458 718/1 |
| 2017/0331922 | A1* | 11/2017 | Zhu | H04L 43/04 |
| 2017/0365009 | A1* | 12/2017 | Chen | G06Q 40/12 |

OTHER PUBLICATIONS

Balázs Sonkoly, János Czentye, Robert Szabo, Dávid Jocha, János Elek, Sahel Sahhaf, Wouter Tavernier, and Fulvio Risso. 2015. Multi-Domain Service Orchestration Over Networks and Clouds: A Unified Approach. SIGCOMM Comput. Commun. Rev. 45, 4 (Aug. 2015), 377-378. (Year: 2015).*

D. Sitaram, S. Harwalkar, N. Ashwin and S. K. Ajmal, "Secure Orchestration Based Federation in Hybrid Cloud Environments," 2015 International Conference on Information Technology (ICIT), Bhubaneswar, 2015, pp. 13-19. (Year: 2015).*

E. Sturrus and O. Kulikova, "Orchestrating Hybrid Cloud Deployment: An Overview," in Computer, vol. 47, No. 6, pp. 85-87, Jun. 2014. (Year: 2014).*

Nil "Managing the Complexity of Today's Hybrid IT Environment," Kasey White Paper, 2015, pp. 1-6.

Accenture and Microsoft Launch New Hybrid Cloud Platform to Accelerate Enterprise-Wide Adoption <https://news.microsoft.com/2014/12/08/accenture-and-microsoft-launch-new-hybrid-cloud-platform-to-accelerate-enterprise-wide-adoption/> Dec. 8, 2014, 5 pages.

Akamai: Hybrid cloud <https://www.akamai.com/us/en/resources/hybrid-cloud.jsp> 6 pages.

Centrilogic. Normal hybrid cloud <https://www.centrilogic.com/> 6 pages.

Google search : "Hybrid cloud outsourcing" <https://www.google.com/search?q=%22Hybrid+cloud+outsourcing%22&rlz=1C1OKWM_enUS792US792&oq=%22Hybrid+cloud+outsourcing%22&aqs=chrome..69i57.1184j0j4&sourceid=chrome&ie=UTF-8> 3 pages.

Hajjat et al. "Cloudward bound: planning for beneficial migration of enterprise applications to the cloud." ACM SIGCOMM Computer Communication Review 41.4 (2011): 243-254.

Lazauskas, "4 Essential Steps To Take When Moving To A Hybrid Cloud" <https://www.forbes.com/sites/centurylink/2014/08/13/4-essential-steps-to-take-when-moving-to-a-hybrid-cloud-2/#755a28de420e> Aug. 13, 2014, 5 pages.

MuleSoft: A Major Shift with Hybrid Cloud Integration, ESB <http://www.mulesoft.com/resources/esb/hybrid-cloud-integration-solutions> 4 pages.

Snt Solutions: Hybrid cloud hosting <http://www.sntsolutions.co.uk/cloud-technology/hybrid-cloud/> 8 pages.

T-systems: Simple management and control of multi-cloud models <http://test-and-order.t-systems.com/ecp-en/test-order/cloud-broker/15650> 3 pages.

* cited by examiner

JOINTLY MANAGING A CLOUD AND NON-CLOUD ENVIRONMENT

BACKGROUND

The present disclosure relates to cloud computing environments and, more particularly, relates to techniques for jointly managing a cloud and non-cloud environment.

Cloud computing provides lower cost, better scalability, increased reliability, and the like, making cloud computing desirable to large enterprises. However, many large enterprises have existing software applications that are not, in their current state, suitable for cloud implementation. For instance, an existing software application may only run on older operating systems not running on a cloud computing environment, may run on a very different operating system (e.g., for a mainframe) than supported by the cloud computing environment, may use other software that is not supported in the cloud computing environment, or may be optimized for specific hardware.

SUMMARY

According to examples of the present disclose, techniques including methods, systems, and/or computer program products for jointly managing a cloud and non-cloud environment are provided. An example method may include: receiving a request to be executed on one of a cloud resource and a non-cloud resource using one of cloud orchestration and non-cloud orchestration, the request comprising a plurality of tasks; based on a determination to execute a first task of the plurality of tasks on the cloud resource using cloud orchestration, scheduling the first task for execution on the cloud resource by a cloud orchestration device using a joint cloud and non-cloud management device; based on a determination to execute a second task of the plurality of tasks on the non-cloud resource using non-cloud orchestration, scheduling the second task for execution on the non-cloud resource by a non-cloud orchestration device using a non-cloud management device; and based on a determination to execute a third task of the plurality of tasks on the non-cloud resource using non-cloud orchestration, scheduling the third task for execution on the non-cloud resource by the non-cloud orchestration device using the joint cloud and non-cloud management device.

An example system may include: a service management device; a cloud orchestration device; a non-cloud orchestration device; a joint cloud and non-cloud management device; and a non-cloud management device. The service management device is configured to receive a first request, and address, based on the first request received, the first request to one of the cloud orchestration device and the non-cloud orchestration device. The cloud orchestration device is configured to receive a second request from the service management device, to address, based on the second request, the second request to the joint cloud and non-cloud management device, and to identify, based on the second request, a first task to schedule for execution by a cloud software application. The non-cloud orchestration device is configured to receive the second request from the service management device, address, based on the second request, the second request to an appropriate one of the joint cloud and non-cloud management device and the non-cloud management device, and identify a second task to schedule for execution by a non-cloud software application. The joint cloud and non-cloud management device is configured to receive a third request from at least one of the cloud orchestration device and the non-cloud orchestration device, identify, based on the third request, a third task to be performed using both the cloud software application and the non-cloud software application, and execute the identified third task using the cloud software application and the non-cloud software application.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of jointly managed cloud and non-cloud environments. In particular, umbrella service management for the cloud and non-cloud environments is provided. It serves as a portal for service requests (or other requests) containing standardized cloud requests, semi-standardized non-cloud requests, and free-form requests for other non-cloud tasks. This enables enterprises to input and track service requests and to perform other processes in a unified way.

The present techniques utilize a management model that combines a cloud (typically a private cloud) with non-cloud systems under a common services and operational management umbrella. The non-cloud portion may be referred to as "legacy" but it may comprise modern systems too such as state-of-the-art mainframes or software that is too specific to be integrated into a cloud. Instead of building a joint cloud and non-cloud system, it may be possible to transform the application to be cloud compliant. There are multiple tools to advise on cloud fitness and possible changes, but sometimes (such as for mainframes), a transformation is really not suitable. Moreover, such a transformation may be very expensive (e.g., consolidating on fewer types of UNIX systems or application servers) and/or very time consuming.

In some implementations, the present techniques save resources (i.e., systems and humans) by providing not only a thin layer of umbrella management over two separate systems (cloud and non-cloud), but also integrating as many aspects of the systems as possible (e.g., the joint operational and security management aspects). Additionally, the dual management system also enables the cloud to at least partially run on a private enterprise because the physical infrastructure can be managed in a non-cloud way while higher logical layers can be designed and managed with the cloud automation. These and other advantages will be apparent from the description that follows.

Figure 1:
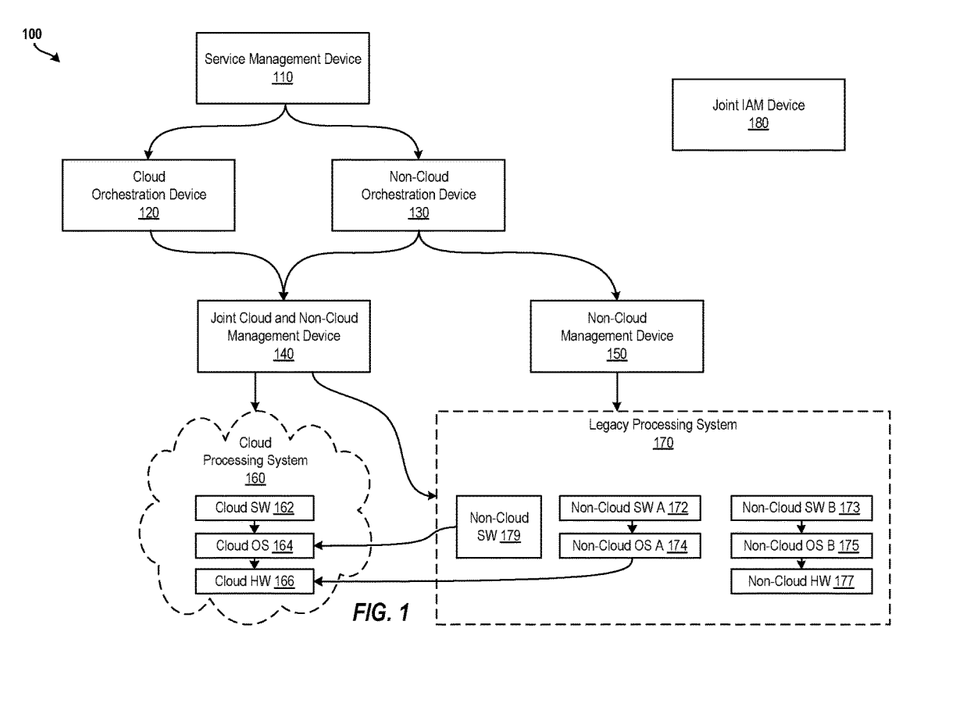
FIG. 1 illustrates a block diagram of a processing environment for jointly managing a cloud and non-cloud environment according to examples of the present disclosure.

FIG. 1 illustrates a block diagram of a processing environment 100 for implementing the techniques described herein. In particular, processing system 100 includes a service management device 110, a cloud orchestration device 120, a non-cloud orchestration device 130, a joint cloud and non-cloud management device 140, and a non-cloud management device 150.

Service management device 110 is a joint portal for receiving and processing requests (e.g., service requests, change requests, etc.). The requests may contain standardized cloud requests, semi-standardized non-cloud requests (e.g., for "provisioning" of certain non-cloud components), and free-form requests for non-cloud tasks. This enables an enterprise to input and track service requests and perform information technology infrastructure library (ITIL) processes in a unified manner. In particular, this may be beneficial for bundled requests between cloud and non-cloud tasks (e.g., installing non-cloud software on a cloud operating system (OS)), possibly in one step. It also allows unified business services such as billing, service level agreement (SLA) validation, etc., across the cloud and non-cloud environment.

Service management device 110 receives the request from a service requestor or from a customer service management component (not shown) and a job plan is selected and starts. It is then determined whether the job plan is to be executed on a cloud processing system 160, a legacy processing system 170, or a combination thereof.

For pre-defined cloud requests (i.e., where either the initial request or a task in the job plan is automated by cloud orchestration) cloud orchestration device 120 receives the request via a cloud orchestration command from service management device 110 for requests to be executed on cloud processing system 160 and starts a workflow step. For each workflow step, cloud orchestration device 120 calls joint cloud and non-cloud management device 140 to execute the request on cloud processing system 160 using cloud software 162, cloud operating system 164, and cloud hardware 166. In other examples, the cloud orchestration device 120 may also directly interact with the cloud processing system 160 for execution of a workflow step.

For pre-defined, non-cloud provisioning requests, the following occurs. In this example, provisioning refers to providing a new component, such as a virtual or physical machine, a database, a web server, any other software, a file server, a user, rights for a user, a subnet, a firewall rule, a load balancer rule, or any other IT component. For a pre-defined request, there is a pre-defined job plan to perform the following tasks.

For non-cloud hardware, the hardware is provisioned into a non-cloud subnet, virtual local area network (VLAN), or network security zone. Cloud and non-cloud hardware might also be on the same subnet, VLAN, or network security zone. The benefit of separation is to protect the possibly higher security within the cloud environment. The new hardware is registered in the joint cloud and non-cloud management device 140 (e.g., for subsequent monitoring and capacity management) if the hardware is supported in cloud processing system 160. Otherwise, the new hardware is registered in the non-cloud management device 150. Non-cloud orchestration may be used for lower-level workflows for each of these steps.

For provisioning requests for a non-cloud operating system, an operating system (OS) is installed and provisioned on cloud processing system 160 if the OS can run on cloud hardware 166. The new OS is then an instance of Non-Cloud OS A 174, running on cloud hardware 166. A capacity and placement component of joint cloud and non-cloud management device 140 is used for selecting the placement of non-cloud OS 174 on the multiple instances of cloud hardware, e.g., on one of multiple physical servers or a hypervisor, or cluster of hypervisors, as well as providing it with storage. However, if the OS cannot run on cloud hardware 166, the operating system is installed and provisioned on non-cloud hardware 177 as non-cloud OS B 175, for example, using a non-cloud capacity and placement component of non-cloud management device 150. In each case, the actual provisioning may be performed using non-cloud orchestration 130.

To make the OS manageable (i.e., to provide it with capabilities such as backup, monitoring, patching, virus checking, asset management, configuration management, log analysis, file integrity checking, central scheduling, endpoint automation, and the like), the following is performed for both a non-cloud OS A 174 and a non-cloud OS B 175. If the OS can be managed by joint cloud and non-cloud management device 140, necessary cloud management agents (i.e., components belonging to the above-mentioned management system that need to run locally on the OS) are installed and enabled on the OS and necessary configurations on the central servers in the joint cloud and non-cloud management device 140 are performed. For example, a backup agent may be installed on the OS, while a central backup server is configured with the backup schedule, retention period, encryption needs, etc. It should be appreciated that the joint cloud and non-cloud management device 140 can in fact handle such requests for many non-cloud OS and middleware types because it is typically a combination of off-the-shelf management products, such as for monitoring, backup etc., which are built by their vendors for a broader range of target OS and middleware types than the given cloud standardizes on. Otherwise if the OS cannot be managed by joint cloud and non-cloud management device 140, necessary non-cloud management agents are installed and enabled on the OS and necessary configurations on non-cloud management device 150 are performed. The installation is performed with non-cloud orchestration device 130 in both cases because the detailed workflows for the installation and enablement of the management tools are typically at least slightly different on non-cloud OS A 174 and/or non-cloud OS B 175 versus cloud OS 164.

Access rights are then provided in joint identity and access management (IAM) device 180 (discussed below). In particular, providing access rights for administrators, etc., is performed with non-cloud orchestration device 130 because the detailed access rights needed and workflows for enforcing them are typically different on non-cloud OS A 174 (running non-cloud software A 172) and/or non-cloud OS B 175 (running non-cloud software B 173) versus cloud OS 164.

For provisioning requests for non-cloud software 179 (i.e., common, off-the-shelf software such as web servers, application servers, databases, etc.), the non-cloud software 179 is installed. If the non-cloud software 179 can run on cloud OS 164, the non-cloud software 179 is provisioned on cloud OS 164. For this, the OS object in a configuration management database (CMDB) (not shown, but part of service management device 110) is locked so that no cloud orchestration flow accesses cloud OS 164 at the same time (i.e., while the provisioning is being performed by non-cloud orchestration device 130). Else, if the middleware can run on non-cloud OS A 174 (executable on cloud HW 166), then the middleware is provisioned on non-cloud OS A 174. Otherwise, non-cloud OS B 175 (executable on non-cloud HW 177) is used. The installation of the middleware is performed with non-cloud orchestration device 130 in both cases.

Next, the middleware is made manageable. If the middleware can be managed by joint cloud and non-cloud management device 140, necessary cloud management agents are installed and enabled on the middleware and necessary configurations are performed by joint cloud and non-cloud management device 140. However, if the middleware cannot be managed by joint cloud and non-cloud management device 140, necessary non-cloud management agents are installed and enabled on the middleware and necessary configurations are performed by non-cloud management device 150. The installation of the middleware is performed with non-cloud orchestration device 130 in both cases. Access rights are then provided in joint IAM device 180 for administrators, etc., using non-cloud orchestration device 130.

For requests for an action on an already provisioned component, the following is performed. First, the job plan contains a list of all components affected by a particular request received by service management device 110. For example, a request for a middleware change may also affect the operating system (such as its registry) or joint IAM device 180 (for additional users). These components are locked in the CMDB so that no other request's job plan operates on the same components at the same time. These components are unlocked at the end of the job plan. Additionally, the components may be locked in the joint IAM device 180 to prevent conflicts with human operators.

For cloud requests on a cloud component, there is automation in cloud orchestration device 120 for the request and only cloud components are accessed. Non-cloud requests on a cloud component are then considered. Although this may be a rare case, and some clouds may only allow it if no administrative rights on any cloud-managed component are needed for the request, in order to ensure that the components remain in the same state believed by cloud orchestration device 120 and joint cloud and non-cloud management device 140. Any such request is handled with non-cloud orchestration device 130. In examples, CMDB and locking mechanisms are in the service management device 110, so that the cloud orchestration device 120 finds the correct state after the actions of non-cloud orchestration device 130 there. Besides the cloud component, it may touch either joint cloud and/or non-cloud management device 140 that is already managing the cloud component (e.g., a request for a certain monitoring report that the cloud does not offer as a standard, but that can be produced with the monitoring systems inside the joint cloud and/or non-cloud management device 140), or some additional non-cloud systems management (e.g., if there is a specific monitoring need for an application that the standard joint cloud and non-cloud management device 140 does not fulfill). Requests on a non-cloud component are considered a non-cloud request and are handled with non-cloud orchestration device 130. Joint cloud and non-cloud management device 140 or non-cloud management device 150 may be involved depending on the request.

For non-pre-defined requests, decisions are made at run-time and may be made manually by humans (e.g., system administrators). Some actions in the high-level job plan in the service management device 110 are still standard, such as approvals and sign-offs. However, only non-cloud orchestration device 130 is used, unless it is decided that part of the non-pre-defined request can be fulfilled by a pre-defined request. In that case, the non-pre-defined request is made to service management device 110. Furthermore, certain initializations may be needed. For example, if a non-cloud hardware, OS, or middleware type occurs the first time, enablement of existing systems management tools, preferably from joint cloud and non-cloud management device 140, else from non-cloud management device 150 are provided for the request as far as those components can handle the request (e.g., installation procedures for corresponding agents, such as a backup or monitoring agent for the OS or middleware). If a specific non-cloud systems management tool is needed the first time, it may be installed in central servers within the non-cloud management device 150 first. For instance, if an application requires a specific scheduler that is not yet part of either the joint cloud and non-cloud management device 140 or the non-cloud management device 150, the central server component of this scheduling system is installed before corresponding agents are provisioned to the servers (cloud or non-cloud) where this application is running. If a non-cloud hardware, OS, or middleware type occurs the first time, enablement of joint IAM device 180 may also be provided for it first.

In examples, processing system 100 may also include a joint IAM service 180, primarily for the identity and access management for all the other devices and systems. Joint IAM device 180 interfaces with service management device 110, cloud orchestration device 120, non-cloud orchestration device 130, joint cloud and non-cloud management device 140, non-cloud management device 150, cloud processing system 160, and/or legacy processing system 170 using cloud supplier identifiers, non-cloud supplier identifiers, customer identifiers (also referred to as roles), user identities, functional identities, technical identities, and their rights, authorizations, authentication mechanisms, etc. The IAM service 180 may also be used to serve as a conflict avoidance and resolution manager.

Examples of techniques to avoid conflicts between a user and a management system (either joint cloud and non-cloud management device 140 or non-cloud management device 150) are to use maintenance windows and user alarms. For standardized tasks in the job plans (and in particular tasks of fully standardized service requests), the affected managed components from cloud processing system 160 or legacy processing system 170 are known and represented in the CMDB by configuration items. Hence, the service management device 110 can lock the configuration items and provide the user alarms. For free-form tasks where service management device 110 may not know all affected configuration items in the CMDB, a human change may be applied to lock the appropriate configuration items so that again the service management device 110 can administrate the locks and corresponding alarms.

Joint IAM device 180 may also serve as an additional gate against conflicts if privileged access has to go through a check-out mechanism such that only one privileged user can access one managed component at any time. This may also be useful during auditing.

In additional examples, joint IAM device 180 may also prevent human/operational management conflicts. In this way, the operational management would have to go through joint IAM device 180. In addition, service management device 110 and joint IAM device 180 could be refined to role-based locking. For example, if one database administrator role checks out a credential, no other person in this role can do so at the same time. Whether an OS administrator role can do so may be decided based on potential conflicts in their rights.

Figure 2:
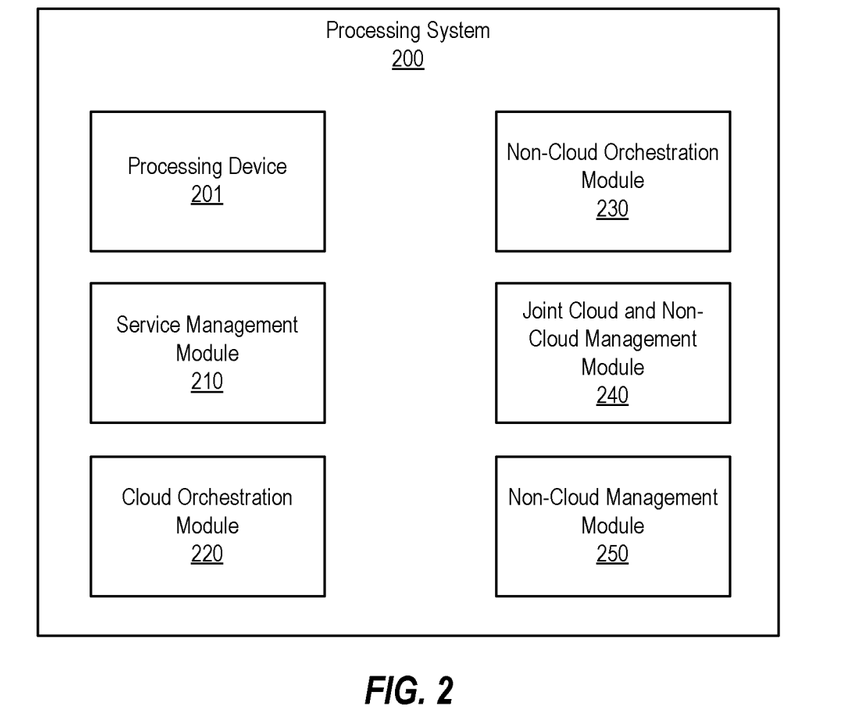
FIG. 2 illustrates a block diagram of a processing system for jointly managing a cloud and non-cloud environment according to examples of the present disclosure.

FIG. 2 illustrates a block diagram of a processing system 200 for jointly managing a cloud and non-cloud environment according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 201 for executing those instructions. Thus a system memory can be said to store program instructions that when executed by processing device 201 implement the engines described herein. Other engines may also be utilized to include other features and functionality described in other examples herein.

Processing system 200 may include processing device 201, a service management module 210, a cloud orchestration module 220, a non-cloud orchestration module 230, a joint cloud and non-cloud management module 240, and a non-cloud management module 250. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Service management module 210 may be configured to receive a first request, and address, based on the first request received, a second request to one of the cloud orchestration module 220 and the non-cloud orchestration module 230. This second request may be defined in one of individual tasks of the job plan that the service management module 210 has for the first request. There may be more than one such second request until the first request is fulfilled.

Cloud orchestration module 220 may be configured to receive a second request from the service management device, to identify, based on the second request, a first task to schedule for execution regarding the cloud processing system 160, and to address, based on the first task, a third request to the joint cloud and non-cloud management device 240.

Non-cloud orchestration module 230 may be configured to receive the second request from the service management device, to identify, based on the second request, a second task to schedule for execution regarding the non-cloud processing system 170, and to address, based on the second task, a third request to an appropriate one of the joint cloud and non-cloud management module 240 and the non-cloud management module 250.

Joint cloud and non-cloud management module 240 may be configured to receive a third request from at least one of the service management device and the non-cloud orchestration device, identify, based on the third request, a third task to be performed using either or both the cloud processing system 160 and the non-cloud processing system 170, and execute the identified third task using the cloud processing system 160 and the non-cloud processing system 170.

Figure 3:
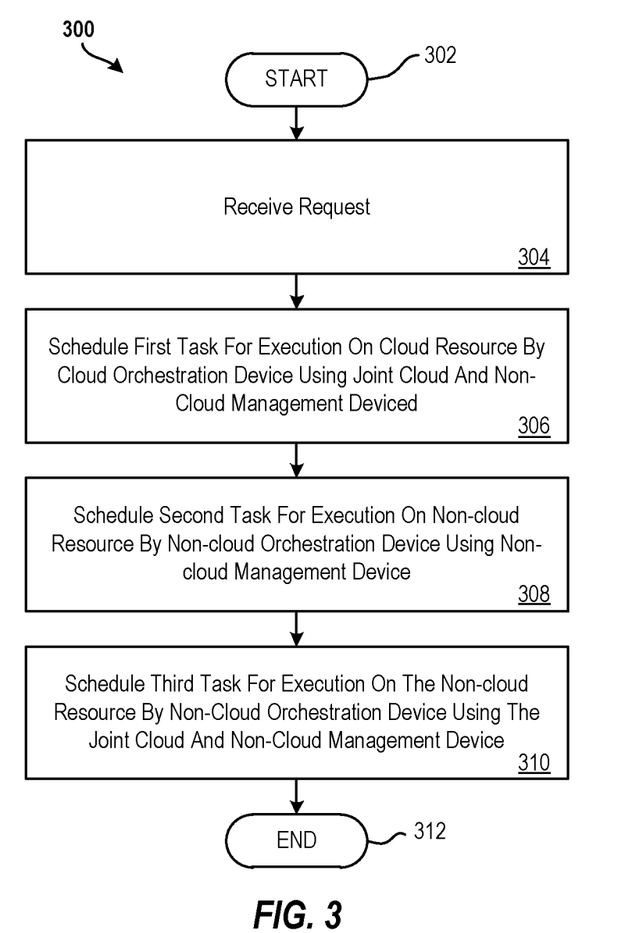
FIG. 3 illustrates a block diagram of a method for jointly managing a cloud and non-cloud environment according to examples of the present disclosure.

FIG. 3 illustrates a flow diagram of a method 300 for jointly managing a cloud and non-cloud environment according to examples of the present disclosure. Method 300 starts at block 302 and continues to block 304.

At block 304, method 300 includes receiving a request (e.g., a service request, a change request, etc.) to be executed on one of a cloud resource (e.g., cloud processing system 160 of FIG. 1) and a non-cloud resource (e.g., legacy processing system 170 of FIG. 1) using one of cloud orchestration and non-cloud orchestration, the request comprising a plurality of tasks.

At block 306, method 300 includes scheduling the first task for execution on the cloud resource by a cloud orchestration device using a joint cloud and non-cloud management device based on a determination to execute a first task of the plurality of tasks on the cloud resource using cloud orchestration. This is described in additional detail regarding FIG. 4 below, specifically regarding block 428.

At block 308, the method 300 includes scheduling the second task for execution on the non-cloud resource by a non-cloud orchestration device using a non-cloud management device based on a determination to execute a second task of the plurality of tasks on the non-cloud resource using non-cloud orchestration. This is described in additional detail regarding FIG. 4 below, specifically regarding block 452.

At block 310, the method 300 includes scheduling the third task for execution on the non-cloud resource by the non-cloud orchestration device using the joint cloud and non-cloud management device based on a determination to execute a third task of the plurality of tasks on the non-cloud resource using non-cloud orchestration. This is described in additional detail regarding FIG. 4 below, specifically regarding block 430. Method 300 continues to block 312 and ends.

Additional processes also may be included. For example, method 300 may include receiving a first indication that the first task was executed on the cloud software application, and storing the first indication in a configuration management database. Method 300 may also include receiving a second indication that the second task was executed on the non-cloud software application and storing the second indication in the configuration management database. Method 300 may further include receiving a third indication that the third task was executed on the cloud software application and the non-cloud software application, and storing the third indication in the configuration management database.

Method 300 may further include determining whether to schedule on of the plurality of tasks on one of the cloud orchestration device and the non-cloud orchestration device. Method 300 may also include performing conflict resolution when a conflict is identified between one of a user and the joint cloud and non-cloud management device and the non-cloud management device. Method 300 may also include sending an alarm to the user alerting the user of the conflict.

In examples, the cloud software application executes on a cloud hardware device, and the non-cloud software application executes on a non-cloud hardware device. In other examples, the non-cloud software application executes on a cloud hardware device. It should be understood that the processes depicted in FIG. 3 represent illustrations, and that other processes may be added or existing processes may be removed, modified, or rearranged without departing from the scope and spirit of the present disclosure.

Figure 4:
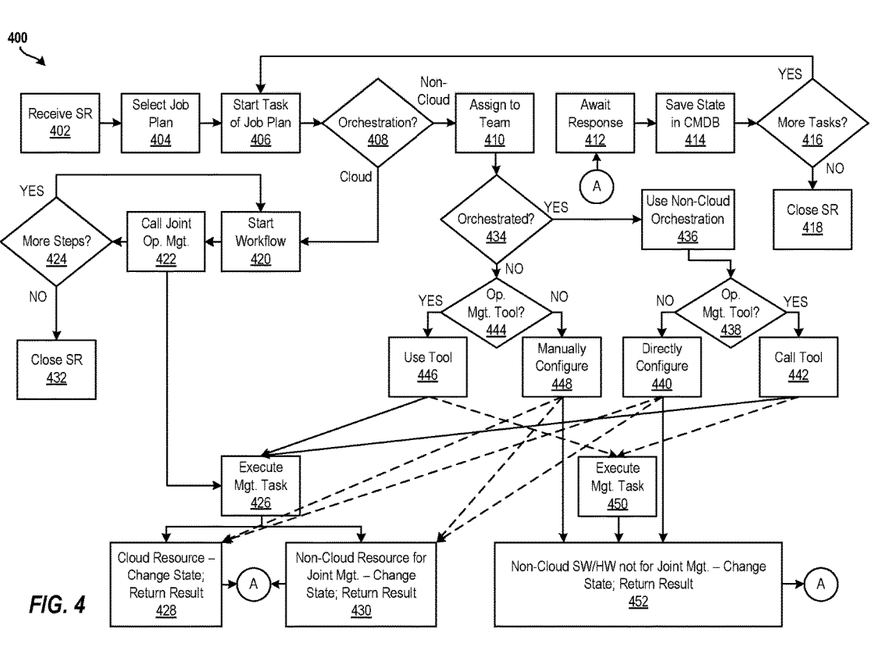
FIG. 4 illustrates a block diagram of a method for fulfilling a service request in a cloud and non-cloud environment according to examples of the present disclosure.

FIG. 4 illustrates a flow diagram of a method 400 for fulfilling a service request in a cloud and non-cloud environment according to examples of the present disclosure. At block 402, a service request is received and a job plan is selected at block 404. At block 406, a task of the job plan is started, and it is determined whether cloud or non-cloud orchestration is used at decision block 408. If non-cloud orchestration is determined to be used at decision block 408, the task is assigned to a team, such as a delivery team of system administrators, at block 410, which sends the task through non-cloud orchestration to be executed on cloud and non-cloud resources.

The non-cloud task assigned to the delivery team at 410 is passed to non-cloud orchestration at decision block 434 where it is determined whether the task is orchestrated, i.e., whether there is a predefined workflow for it, preferably an automated one. If so, a non-cloud orchestration tool is used at block 436 and it is then determined whether an operational management tool exists that is suited for executing the first step in the workflow (and later similarly for other steps as appropriate) at decision block 438. If not, the task is to be executed by directly configuring the respective resources at block 440 and executed on non-cloud SW/HW not for joint management 452. However, if a suitable operational management tool does exist at decision block 438, an API call to the operational management tool at block 442 is made and the task is executed at block 426 or block 450, depending on whether to tool is part of the joint cloud and non-cloud management device or the non-cloud management device.

If non-cloud orchestration does not exist at decision block 434, it is determined whether an operational management tool exists at decision block 444. If not, the task is to be executed by manually configuring the respective resources at block 448 and executed on non-cloud SW/HW not for joint management 452. However, if an operational management tool does exist at decision block 444, a user interface is presented to a system administrator to cause the management task to be executed at block 426 or 450.

Upon executing the various tasks, cloud resource, non-cloud resource for joint management, and non-cloud SW/HW not for joint management changes the state as appropriate based on the task and returns a result to block 412.

Upon receiving an awaited response from the cloud and non-cloud resources at block 412, the state of the task is saved in a configuration management database (CMDB) at block 414, and it is determined whether more tasks are to be completed at decision block 416. If more tasks are to be completed, method 400 returns to block 406 and continues executing tasks of the job plan. However, if no more tasks are to be completed, the service request is closed at block 418.

If cloud orchestration is determined to be used at decision block 408, an automated workflow is started at block 420 starting with a first step. At block 422, a call is made to a joint operational management device (e.g., joint cloud and non-cloud management device 140 of FIG. 1) to execute a management task. At block 426, the management task is executed on a cloud resource (e.g., cloud processing system 160 of FIG. 1) at block 428 at block 430. Additional steps of the workflow may be executed by cycling through decision block 424. If no more steps of the workflow exist, the service request is closed at block 432.

It should be appreciated that the solid bold lines represent standard paths through method 400, as described above. However, in other examples, the dashed lines represent non-standard paths which may result, for example, if non-cloud software executes on a cloud OS because certain actions on the cloud OS might not be automated in some cases. For example, a call to the management tool at block 442 and/or use of the management tool at block 446 may result in executing the management task at 450 using non-cloud SW/HW not for joint management.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
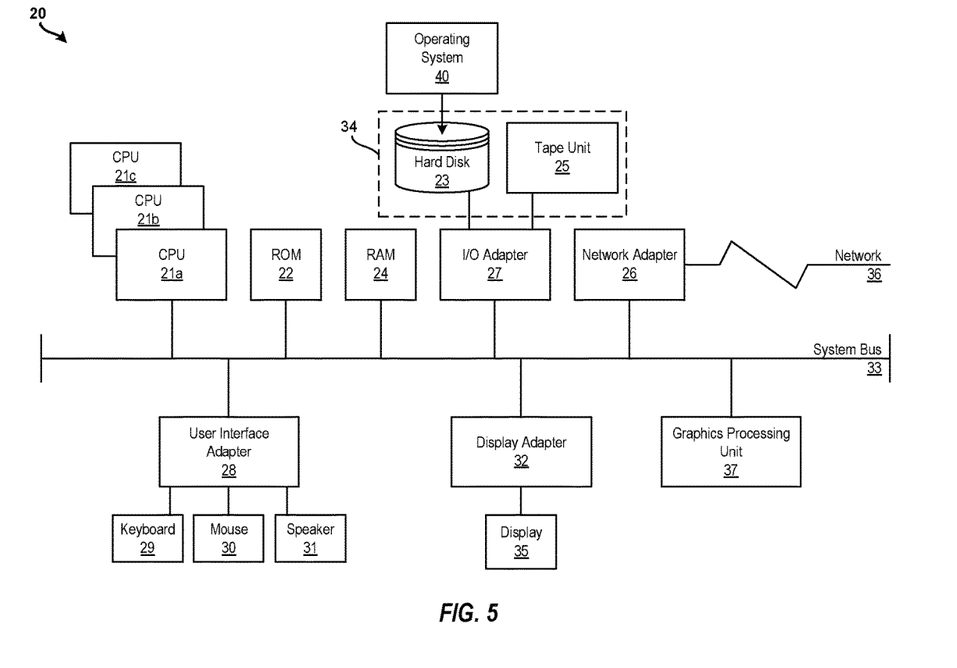
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) $21a$, $21b$, $21c$, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

In other examples, the present disclosure may be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
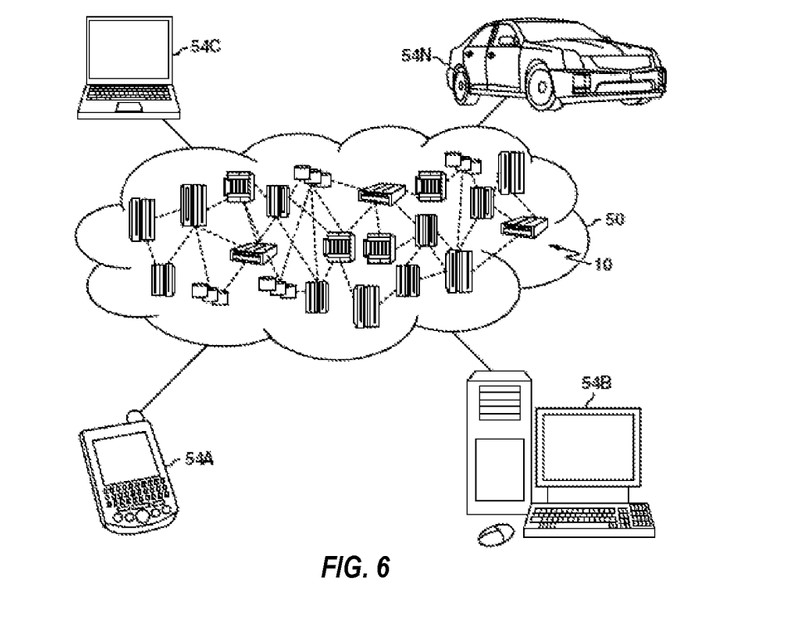
FIG. 6 illustrates a cloud computing environment according to examples of the present disclosure.

Referring now to FIG. 6, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
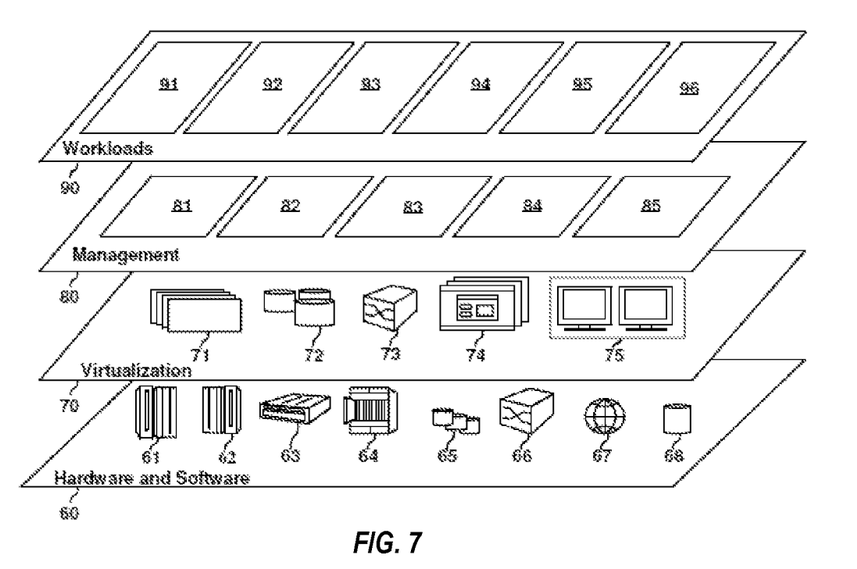
FIG. 7 illustrates abstraction model layers according to examples of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and jointly managing cloud and non-cloud environments 96.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for jointly managing a cloud and non-cloud environment, the method comprising:
receiving a request to be executed on one of a cloud resource and a non-cloud resource using one of cloud orchestration and non-cloud orchestration, the request comprising a plurality of tasks;
determining, by a processing device, based on the request, whether to execute a first task of the plurality of tasks on the cloud resource using cloud orchestration;
based on a determination to execute the first task of the plurality of tasks on the cloud resource using cloud orchestration, scheduling the first task for execution on the cloud resource by a cloud orchestration device using a joint cloud and non-cloud management device;
determining, by the processing device, based on the request, whether to execute a second task of the plurality of tasks on the non-cloud resource using non-cloud orchestration;
based on a determination to execute the second task of the plurality of tasks on the non-cloud resource using non-cloud orchestration, scheduling the second task for execution on the non-cloud resource by a non-cloud orchestration device using a non-cloud management device;
determining, by the processing device, based on the request, whether to execute a third task of the plurality of tasks on the non-cloud resource using non-cloud orchestration; and
based on a determination to execute the third task of the plurality of tasks on the non-cloud resource using non-cloud orchestration, scheduling the third task for execution on the non-cloud resource by the non-cloud orchestration device using the joint cloud and non-cloud management device, wherein the joint cloud and non-cloud management device executes the third task using a cloud software application and a non-cloud software application, the non-cloud software application being provisioned on an operating system of the cloud resource.

2. The computer-implemented method of claim 1, further comprising:
receiving a first indication that the first task was executed by the cloud resource; and
storing the first indication in a configuration management database.

3. The computer-implemented method of claim 2, further comprising:
receiving a second indication that the second task was executed by the non-cloud resource; and
storing the second indication in the configuration management database.

4. The computer-implemented method of claim 3, further comprising:
receiving a third indication that the first task was executed on the non-cloud resource; and
storing the third indication in the configuration management database.

5. The computer-implemented method of claim 1, further comprising:
determining whether to schedule one of the plurality of tasks on one of the cloud orchestration device and the non-cloud orchestration device.

6. The computer-implemented method of claim 1, further comprising:
performing conflict resolution when a conflict is identified between one of a user and the joint cloud and non-cloud management device and the non-cloud management device.

7. The computer-implemented method of claim 6, further comprising:
sending an alarm to the user alerting the user of the conflict.

8. The computer-implemented method of claim 1, wherein the request is one of a service request and a change request.

9. A system for jointly managing a cloud and non-cloud environment, the system comprising:
- a memory having computer readable instructions; and
- a processing device for executing the computer readable instructions, the computer readable instructions comprising:
  - receiving a request to be executed on one of a cloud resource and a non-cloud resource using one of cloud orchestration and non-cloud orchestration, the request comprising a plurality of tasks;
  - determining, based on the request, whether to execute a first task of the plurality of tasks on the cloud resource using cloud orchestration;
  - based on a determination to execute the first task of the plurality of tasks on the cloud resource using cloud orchestration, scheduling the first task for execution on the cloud resource by a cloud orchestration device using a joint cloud and non-cloud management device;
  - determining, based on the request, whether to execute a second task of the plurality of tasks on the non-cloud resource using non-cloud orchestration;
  - based on a determination to execute the second task of the plurality of tasks on the non-cloud resource using non-cloud orchestration, scheduling the second task for execution on the non-cloud resource by a non-cloud orchestration device using a non-cloud management device;
  - determining, based on the request, whether to execute a third task of the plurality of tasks on the non-cloud resource using non-cloud orchestration; and
  - based on a determination to execute the third task of the plurality of tasks on the non-cloud resource using non-cloud orchestration, scheduling the third task for execution on the non-cloud resource by the non-cloud orchestration device using the joint cloud and non-cloud management device, wherein the joint cloud and non-cloud management device executes the third task using a cloud software application and a non-cloud software application, the non-cloud software application being provisioned on an operating system of the cloud resource.

10. The system of claim 9, the computer readable instructions further comprising:
- receiving a first indication that the first task was executed by the cloud resource; and
- storing the first indication in a configuration management database.

11. The system of claim 10, the computer readable instructions further comprising:
- receiving a second indication that the second task was executed by the non-cloud resource; and
- storing the second indication in the configuration management database.

12. The system of claim 11, the computer readable instructions further comprising:
- receiving a third indication that the first task was executed on the non-cloud resource; and
- storing the third indication in the configuration management database.

13. The system of claim 9, the computer readable instructions further comprising:
- determining whether to schedule one of the plurality of tasks on one of the cloud orchestration device and the non-cloud orchestration device.

14. The system of claim 9, the computer readable instructions further comprising:
- performing conflict resolution when a conflict is identified between one of a user and the joint cloud and non-cloud management device and the non-cloud management device.

15. The system of claim 14, the computer readable instructions further comprising:
- sending an alarm to the user alerting the user of the conflict.

16. The system of claim 9, wherein the request is one of a service request and a change request.

17. A computer program product for jointly managing a cloud and non-cloud environment, the computer program product comprising:
- a non-transitory computer readable storage medium having program instructions embodied therewith, the program instructions executable by a processing device to cause the processing device to:
  - receive a request to be executed on one of a cloud resource and a non-cloud resource using one of cloud orchestration and non-cloud orchestration, the request comprising a plurality of tasks;
  - determining, based on the request, whether to execute a first task of the plurality of tasks on the cloud resource using cloud orchestration;
  - based on a determination to execute the first task of the plurality of tasks on the cloud resource using cloud orchestration, schedule the first task for execution on the cloud resource by a cloud orchestration device using a joint cloud and non-cloud management device;
  - determining, based on the request, whether to execute a second task of the plurality of tasks on the non-cloud resource using non-cloud orchestration;
  - based on a determination to execute the second task of the plurality of tasks on the non-cloud resource using non-cloud orchestration, schedule the second task for execution on the non-cloud resource by a non-cloud orchestration device using a non-cloud management device;
  - determining, based on the request, whether to execute a third task of the plurality of tasks on the non-cloud resource using non-cloud orchestration; and
  - based on a determination to execute the third task of the plurality of tasks on the non-cloud resource using non-cloud orchestration, schedule the third task for execution on the non-cloud resource by the non-cloud orchestration device using the joint cloud and non-cloud management device, wherein the joint cloud and non-cloud management device executes the third task using a cloud software application and a non-cloud software application, the non-cloud software application being provisioned on an operating system of the cloud resource.

18. The computer program product of claim 17, the program instructions further executable by the processing device to cause the processing device to:
- determine whether to schedule one of the plurality of tasks on one of the cloud orchestration device and the non-cloud orchestration device.

19. The computer program product of claim 17, the program instructions further executable by the processing device to cause the processing device to:
- perform conflict resolution when a conflict is identified between one of a user and the joint cloud and non-cloud management device and the non-cloud management device; and
- send an alarm to the user alerting the user of the conflict.

20. A system for jointly managing a cloud and non-cloud environment, the system comprising:
- a service management device;
- a cloud orchestration device;
- a non-cloud orchestration device;
- a joint cloud and non-cloud management device; and
- a non-cloud management device,
- wherein the service management device is configured to
  - receive a first request, and
  - address, based on the first request received, the first request to one of the cloud orchestration device and the non-cloud orchestration device;
- wherein the cloud orchestration device is configured to
  - receive a second request from the service management device,
  - to address, based on the second request, the second request to the joint cloud and non-cloud management device, and
  - to identify, based on the second request, a first task to schedule for execution by a cloud software application;
- wherein, the non-cloud orchestration device is configured to
  - receive the second request from the service management device,
  - address, based on the second request, the second request to an appropriate one of the joint cloud and non-cloud management device and the non-cloud management device, and
  - identify a second task to schedule for execution by a non-cloud software application, and
- wherein the joint cloud and non-cloud management device is configured to
  - receive a third request from at least one of the cloud orchestration device and the non-cloud orchestration device,
  - identify, based on the third request, a third task to be performed using both the cloud software application and the non-cloud software application, and
  - execute the identified third task using the cloud software application and the non-cloud software application.

* * * * *